July 2, 1940.   J. GALTER   2,206,532
SHUTTER MECHANISM FOR CAMERAS
Filed April 17, 1940
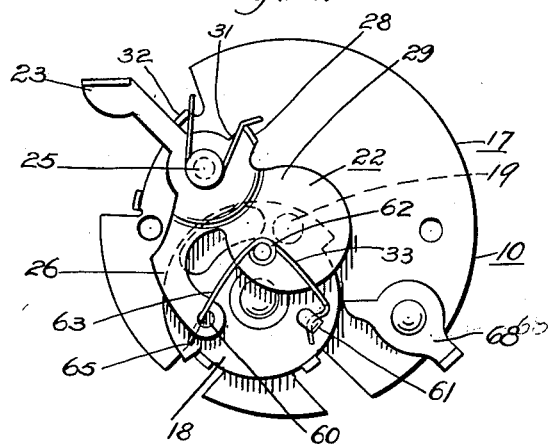
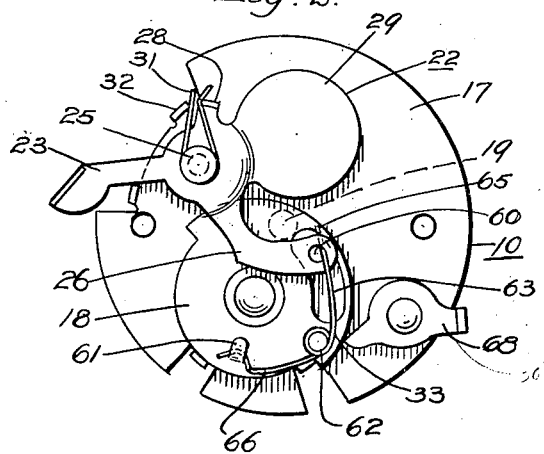
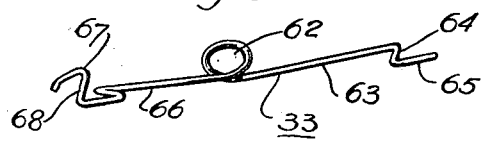
Inventor
Jack Galter
by James R. McKnight
his Attorney Patented July 2, 1940

2,206,532

UNITED STATES PATENT OFFICE 2,206,532

SHUTTER MECHANISM FOR CAMERAS

Jack Galter, Chicago, Ill.

Application April 17, 1940, Serial No. 330,131

3 Claims. (Cl. 95—60)

My invention relates to spring construction between the shutter plate and the trigger arm of the shutter mechanism of a camera.

Among the objects of my invention is to eliminate the rivet construction on the shutter plate and the trigger arm mechanism of a camera, and to provide means cut from the shutter plate and trigger arm for the suspension of an improved spring therebetween; to provide a spring in which bends and loops now in use may be eliminated; to supply a construction which will be simpler in construction, afford greater ease in the assembly of parts and effect substantial economies in production, and such other objects, advantages and capabilities as will later more fully appear and which are inherently possessed by my invention.

While I have shown in thhe accompanying drawing a preferred embodiment of my invention, yet I wish it understood that the same is susceptible of modification and change without departing from the spirit of my invention.

Referring to the drawing, Fig. 1 is a face view of my shutter mechanism for cameras in normal position prior to operation; Fig. 2 is a similar view in extreme operated position before return to normal position, and Fig. 3 is a perspective detailed view of my spring.

In a camera the usual shutter mechanism 10 comprises a metal base plate 17. A shutter plate 18 is pivotally attached to said base plate 17 and in normal position covers the shutter opening 19 in the base plate 17.

A trigger member 22 has a manually operable finger piece 23. The trigger member 22 is pivotally attached to the base plate 17 by a pivot pin 25 and has an arm 26 and a plate portion 29 with a turned up portion 28. A spring 31 extends between turned up portion 28 and stop member 32.

In the above shutter mechanism a safety pin spring ordinarily extends between a rivet on arm 26 and another rivet on shutter plate 18. In the embodiment selected to illustrate my invention I eliminate both of said rivets.

In my invention I provide an opening 60 in the arm 26. From shutter plate 18 I cut out and raise up a lip 61. With this construction my safety pin spring 33 with fewer bends in it may be used.

My spring 33 has between its ends a loop 62. Tangent to loop 62 is a straight portion forming an arm 63. At its outer end the arm 63 is bent substantially at right angles and again at right angles to form a bearing portion 64 and an end portion 65.

Also tangent to and extending from the loop 62 and at an angle to arm 63 is another straight portion forming an arm 66 which ends in a hook 67. The inner curve 68 of the hook 67 is preferably about five degrees less than ninety degrees.

The spring 33 extends between opening 60 and lip 61. The end 65 is slipped into opening 60. Hook 67 contacts the inner and under portion of lip 61. Upon operation of the shutter mechanism, bearing portion 64 rotates on the arm 26 and hook 67 rotates on lip 61.

The bulb lever 68 is shown in operative position in Fig. 1 and in operative position in Fig. 2.

With my construction the rivets heretofore used on the shutter plate and trigger arm are eliminated. The opening in the trigger arm and the raised lip in the shutter plate are easily stamped from the material of these parts. The spring is simple in construction by the omitting of now unnecessary bends and loops and is more quickly put into place. With increased efficiency and longer life great economies in both production and use of the shutter mechanism are achieved.

Having thus described my invention, I claim:

1. In a shutter mechanism for a camera having a trigger arm and a shutter plate, said trigger arm having an opening cut therein, a lip cut and raised from said shutter plate, a spring having a loop portion, a right angle bend adjacent one end and a hook at the other end, the first mentioned end of said spring positioned within the opening of said trigger arm by said right angle bend, the hook on the other end of said spring contacting the raised lip on the shutter plate.

2. In a shutter mechanism for a camera having a trigger arm and a shutter plate, said trigger arm having an opening cut therein, a lip cut and raised from said shutter plate, a spring having a loop portion and an arm extending tangent to said loop ending in a double right angle bend, said spring having another arm extending tangent to said loop ending in a hook having an inner curve five degrees less than ninety degrees, said spring suspended between said trigger arm and said shutter plate, said double right angle bend of said spring rotatable within the opening in said trigger arm and said hook rotatable on the raised lip of said shutter plate.

3. In a shutter mechanism for a camera having a trigger arm member and a shutter plate member, one of said members having an opening cut therein, the other of said members having a lip cut and raised therefrom and a spring having a loop portion, a right angle bend adjacent one end and a hook at the other end, the first mentioned end of said spring positioned within the opening of said member by said right angle bend, and the hook at the other end of said spring contacting the raised lip on said member.

JACK GALTER.